June 9, 1942.  R. C. HITCHCOCK  2,285,658
INSTRUMENT COVER
Filed Jan. 10, 1940

WITNESSES:
E. F. Oberheim
David Kreider

INVENTOR
Richard C. Hitchcock
BY
ATTORNEY

Patented June 9, 1942

2,285,658

UNITED STATES PATENT OFFICE 2,285,658

INSTRUMENT COVER

Richard C. Hitchcock, Upper Montclair, N. J., assignor to Westinghouse Electric & Manufacturing Company, East Pittsburgh, Pa., a corporation of Pennsylvania Application January 10, 1940, Serial No. 313,301

6 Claims. (Cl. 88—1)

My invention relates to measuring instruments and has particular relation to means for eliminating glare which is so often produced by the transparent panels or windows of such instruments.

As is well known, most instruments are provided with covers having transparent panels through which the position of the indicator, generally a pointer, may be observed. Such covers and panels are employed to prevent dirt and dust from getting into the instrument movement and from obscuring the markings of the instrument dial. Although the dial is generally provided with a surface which diffuses incident light and thus produces no glare, the panel, being in most cases of polished glass disposed substantially parallel to the dial, often produces a glare which often may be highly objectionable to the observer.

Whether or not glare is encountered depends upon the relative positions of a panel or window, the light source and the observer, since the angle of reflection equals the angle of incidence. In many cases, as where it is either necessary or convenient to read, from a single observation point, a number of instruments which are fixed on a board or panel, it is impossible to avoid glare from at least one of the instruments when they are constructed according to usual practice. Although the prior art has evolved a fixed oblique glass surface, i. e., glass not parallel to the instrument dial, this is fixed with respect to the dial, and although it may meet one situation, it cannot prevent glare from all observation points. An etched glass surface has also been employed in an attempt to minimize glare, but visibility through this material is poor.

According to my invention, I provide an instrument with a cover including a transparent panel which is disposed at an adjustable angle with respect to the dial. In one form, this glass panel is disposed at a fixed oblique angle to the dial, but the cover or frame of the panel may be rotated to adjust the angle with respect to any line of observation. This permits a single movable cover and a single instrument to be arranged during installation to suit any particular case of lighting and point of observation. The desired result may be obtained with a tilt of only a few degrees, for example, from 5 to 15°. The construction of such an instrument cover is an easy matter, and because of the small angle of tilt, very little additional space is required.

It is accordingly an object of my invention to provide a novel and improved glare-preventing cover for an instrument.

It is another object of my invention to provide an instrument having a transparent cover which may be adjusted to make various angles with reference to the instrument dial.

A further object of my invention is to provide an instrument cover which may be readily adjusted so that observations may be taken from any point relative to the instrument without interference arising from glare.

Other objects and advantages of my invention will become evident from the following detailed description taken in conjunction with the accompanying drawing, in which.

Figure 1:
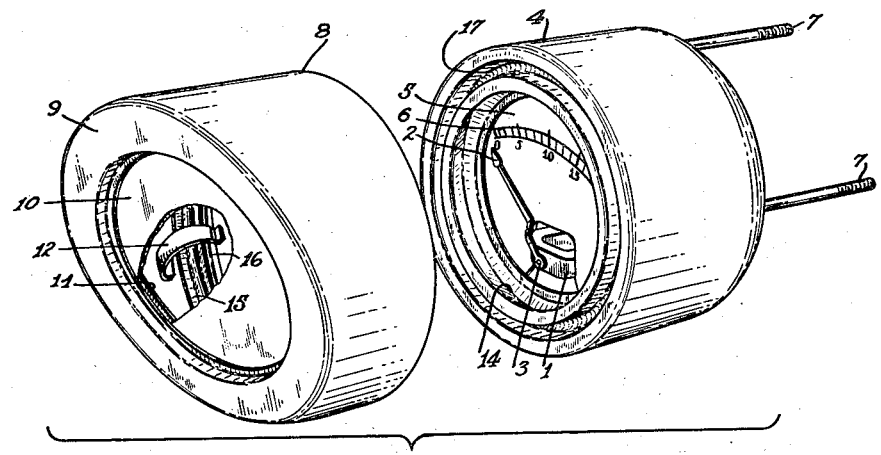
Figure 1 is a perspective view of an instrument and cover in accordance with my invention, but in unassembled relationship.

Referring to the drawing, in which like reference characters indicate like parts, an instrument to which my invention may be applied includes a movement 1 operating a pointer 2 about the pivot at 3. The instrument is secured within a cylindrical casing 4, on the front end of which is located a dial 5 including a scale 6 along which the pointer 2 moves in response to variations in the quantity measured by the instrument. The instrument may comprise terminal plugs 7 for mounting on a switchboard.

Figure 2:
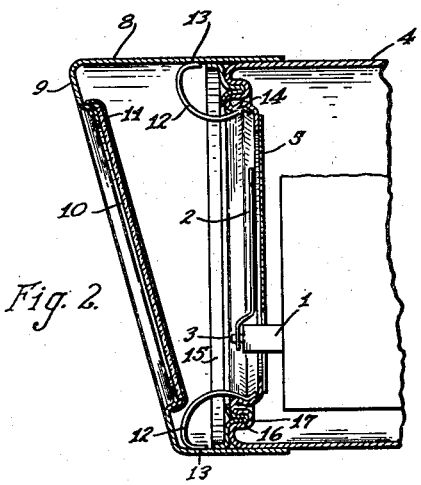
Fig. 2 is a side view, with parts broken away and principally in longitudinal section, of the instrument and cover of Fig. 1 in assembled relationship.

Referring particularly to Figs. 1 and 2, the cover comprises a frame 8 of substantially cylindrical cross-section, and having a centrally apertured front portion 9 angularly disposed with respect thereto. A transparent panel 10 is secured over the aperture in the front portion of the cover frame 8, as by means of an annular member 11 suitably secured to such portion. A number of spring clips 12, as for example four, are fastened to the interior of the cover frame 8 at 13. The free ends of these clips are preferably bent and arranged to fit into an angular groove 14, which is formed in the instrument casing surrounding the dial 5. A dust sealing ring 15, having an annular tongue 16 for seating in a groove 17 in the front of the casing 4, may be secured to the frame 8 in any suitable manner.

Figure 3:
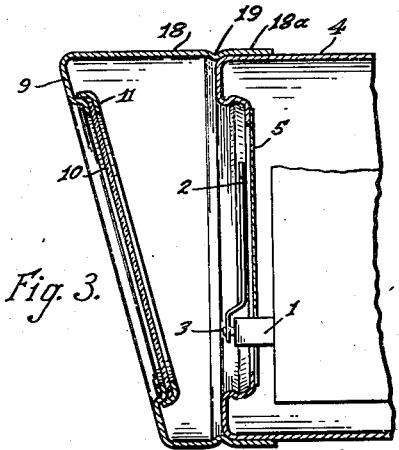
Fig. 3 is a view similar to that of Fig. 2 of a modification of the invention.

In the modified form of the invention shown in Fig. 3, the clips 12 are dispensed with and a slightly different cover designated by 18 is secured to the instrument casing by friction alone. A cylindrical portion 18a of the cover frictionally engages a front edge of a like surface on the casing 4. The instrument and casing may be exactly the same as described in conjunction with Figs. 1 and 2. The cover 18 is preferably provided with an annular bead 19 which engages the front end of the casing 4 to maintain the two members in proper relationship. A dust sealing ring similar to that shown at 15 in Figs. 1 and 2 may be provided, if desired.

Figure 4:
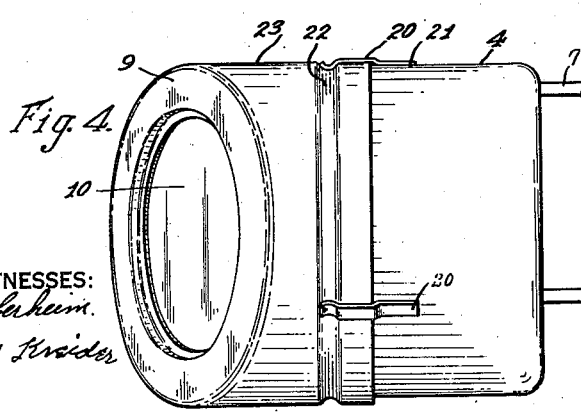
Fig. 4 is a side elevation of another modification of the invention.

In Fig. 4 is shown a modification in which spring clips 20 are secured to the outside of the instrument casing 4 as at 21. The free ends of these clips are curved to engage an annular bead 22 provided in the cover frame 23. In other respects, this construction resembles that of the modifications previously described.

From the foregoing description, the operation of these embodiments of the invention shown in Figs. 2, 3 and 4 will become evident. If the observer encounters glare in viewing the instrument through any of these panels from any position, it is merely necessary for him to rotate the cover frames 8, 18, or 23, to another position. In this manner, a position may be selected at which a glare resulting from reflection of incident light upon the glass panel 10 may either be minimized or eliminated.

Figure 5:
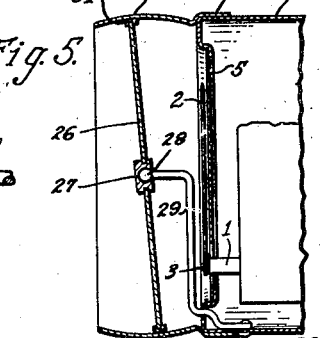
Fig. 5 is a side view, with parts broken away and principally in longitudinal section, of a further modification of the invention.

In Fig. 5, the cover frame comprises a substantially cylindrical portion 24 and a portion 25 in the form of an annular section of a sphere. The cylindrical portion 24 is seated over the front edge of the casing 4, and may be retained there by friction alone or any other suitable means. In this case, a glass panel 26 is apertured in the center and provided with a socket 27, which is arranged to engage a ball 28 on the end of support 29. The other end of this support may be secured to the casing 4 by any suitable means, as, for example, the bolt 30. An annular sealing member 31, which may be cork, a phenol-formaldehyde resin or any other suitable material, is disposed around the circumference of the panel 26 and arranged to engage the interior of the spherical portion 25 of the cover.

With the arrangement of Fig. 5, it will be evident that a glass panel 26 may be adjusted to make various angles with the dial 5. Since the portion 25 of the frame is of spherical configuration, the sealing ring 31 will engage it throughout the angle of adjustment. To eliminate glare which may appear with the panel in any particular position, it is merely necessary to push one of the edges thereof to change the angle which the panel makes with the dial.

The detachability of the covers shown in the drawing and described above makes for convenient adjustment of the instruments. The zero adjuster, which is preferably under the cover and protected against accidental movement thereby, is readily accessible by removing the cover.

While the invention has been described with particular reference to an electrical instrument, it is likewise useful in conjunction with other devices having a transparent cover and a dial, as, for example, clocks and gauges. The term "instrument" in the claims is, therefore, not to be limited to instruments for measuring electrical quantities; and, since many modifications thereof are possible, the invention itself is not to be restricted except insofar as is necessitated by the prior art and the appended claims.

I claim as my invention:

1. An instrument having an indicating portion adapted to be visually observed, an anti-glare cover associated with said instrument including a supporting structure, means for mounting said supporting structure on said instrument adjacent said indicating portion, a light permeable panel, means attaching said panel to said supporting structure at an oblique angle to the indicating portion of the instrument in a position to permit observation of said indicating portion therethrough, said light permeable panel having a surface capable of reflecting light impinging thereon at certain angles of incidence, and said supporting structure being adjustable to permit rotary movement of said light permeable panel to different positions oblique to said indicating portion of the instrument to reflect incident light away from a point of observation.

2. An instrument having a portion to be visually observed, an anti-glare cover associated with said instrument including a supporting structure, means for mounting said supporting structure on said instrument adjacent the portion thereof to be observed for rotation about an axis substantially perpendicular to said portion, a light permeable panel having a surface partially reflective to incident light, and means securing said panel to said supporting structure obliquely to its axis of rotation and the portion of the instrument to be observed to permit observation of said portion therethrough, whereby said supporting structure may be directed to cause said panel to reflect incident light away from a selected point of observation.

3. An instrument having an indicating portion to be visually observed and a substantially circular grooved surface portion extending thereabout, an anti-glare cover associated with said instrument including a supporting structure, means for mounting said supporting structure on said instrument adjacent said indicating portion for rotation about substantially its central axis, a dust-proofing panel secured to said supporting structure and having a portion extending into the grooved portion of the instrument in slidable engagement therewith, a light permeable panel carried by said supporting structure in a position to permit observation of said indicating portion of the instrument therethrough, said light permeable panel extending in a direction oblique to said instrument whereby said supporting structure may be directed to cause said panel to reflect light away from a point of observation.

4. An instrument having an indicating portion to be visually observed, an anti-glare cover on said instrument including a supporting structure having a universal coupling member, and light permeable means carried by said supporting structure through said universal coupling member to permit observation of the said portion of the instrument therethrough, said coupling member being adjustable whereby said light permeable means may be directed to different oblique angular positions relative to said indicating portion of the instrument to reflect incident light away from a point of observation.

5. An instrument having a substantially flat portion to be visually observed, anti-glare means associated with said instrument including a supporting structure, means for mounting said supporting structure on the instrument adjacent the portion thereof to be observed, a substantially flat light permeable panel, and means attaching said panel to said supporting structure over the flat portion of the instrument at an angle oblique thereto to permit observation of said portion through the panel, said supporting structure being adjustable to permit rotary movement of said light permeable panel to different positions oblique to said portion of the instrument to reflect incident light away from a point of observation.

6. An instrument having a substantially flat portion to be visually observed, an anti-glare cover associated with said instrument including a supporting structure, means for mounting said supporting structure on said instrument adjacent the portion to be observed for rotary movement about an axis substantially perpendicular to said portion, a substantially flat light permeable panel, and means for attaching said panel to said supporting structure at an oblique angle to its axis of movement for movement therewith to permit observation of said portion of the instrument therethrough while allowing its adjustment to different oblique positions relative thereto to reflect incident light away from a point of observation.

RICHARD C. HITCHCOCK.